(12) United States Patent
Cook

(10) Patent No.: US 6,522,733 B1
(45) Date of Patent: Feb. 18, 2003

(54) COMMUNICATION GATEWAY SYSTEM

(75) Inventor: Fred S. Cook, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 09/933,324

(22) Filed: Aug. 20, 2001

(51) Int. Cl.⁷ .............................................. H04M 15/00
(52) U.S. Cl. .............................. 379/112.06; 379/112.03; 379/201.02; 379/204.01; 379/207.03; 455/414; 455/435
(58) Field of Search ............................. 379/111, 112.03, 379/112.06, 112.08, 112.1, 133, 201.02, 201.08, 201.12, 204.01, 207.03, 230; 370/229, 232; 455/405, 414, 418, 435

(56) References Cited

U.S. PATENT DOCUMENTS

| | | | | |
|---|---|---|---|---|
| 5,574,770 A | * | 11/1996 | Yoo et al. ...................... | 379/34 |
| 5,809,119 A | * | 9/1998 | Tonomura et al. .......... | 379/112 |
| 6,195,697 B1 | * | 2/2001 | Bowman-Amuah ......... | 709/224 |
| 6,205,211 B1 | * | 3/2001 | Thomas et al. ............. | 379/114 |
| 6,256,310 B1 | * | 7/2001 | Kim et al. ................... | 370/395 |

* cited by examiner

Primary Examiner—Binh Tieu
(74) Attorney, Agent, or Firm—Harley R. Ball; Steven J. Funk; Kevin D. Robb

(57) ABSTRACT

A service control system grants or denies a user's request for a communication session to a communications system. The service control system receives the request. The service control system processes the request to determine the service availability level for the time period for the user. The service control system determines whether to grant the communication based on the service availability level for the time period and the communication system performance. The service control system transfers a reply based on the determination of whether to grant the request for the communication session.

60 Claims, 6 Drawing Sheets

SERVICE LEVEL AGREEMENT

| USER ID 401 | DAY 402 | DATE 403 | FLAGDATE 404 | TIME 405 | APPLICATION 406 | DEVICE 407 | LOCATION 408 | SERVICE AVAILABILITY LEVEL 409 |
|---|---|---|---|---|---|---|---|---|
| SMITH105 | TH | 6/14/01 | | 0:01 | VOICE | WIRELESS | | 30% |
| | | | | 0:02 | VOICE | WIRELESS | | 30% |
| | | | | : | : | : | | : |
| | | | | : | : | : | | : |
| | | | | 5:01 | VOICE | WIRELESS | | 90% |
| | | | | 5:02 | VOICE | WIRELESS | | 90% |
| | | | | : | : | : | | : |
| | | | | 9:01 | VOICE/FAX | WIRELESS | | 60% |
| | | | | 9:02 | VOICE/FAX | WIRELESS | | 60% |
| | | | | : | : | : | | : |
| | | | | 16:01 | IP/VOICE | WIRELESS | | 90% |
| | | | | 16:02 | IP/VOICE | WIRELESS | | 90% |
| | | | | : | : | : | | : |
| | | | | 19:01 | VOICE | WIRELESS | | 60% |
| | | | | 19:02 | VOICE | WIRELESS | | 60% |
| | | | | : | : | : | | : |
| | | | | 23:58 | VOICE | WIRELESS | | 30% |
| | | | | 23:59 | VOICE | WIRELESS | | 30% |
| SMITH105 | FR | 6/15/01 | √ | | | | | 99% |
| SMITH105 | SU | 6/17/01 | | | VOICE | WIRELESS | STADIUM | 95% |

SERVICE LEVEL AGREEMENT

| USER ID 401 | DAY 402 | DATE 403 | FLAGDATE 404 | TIME 405 | APPLICATION 406 | DEVICE 407 | LOCATION 408 | SERVICE AVAILABILITY LEVEL 409 |
|---|---|---|---|---|---|---|---|---|
| SMITH105 | TH | 6/14/01 | | 0:01 | VOICE | WIRELESS | | 30% |
| | | | | 0:02 | VOICE | WIRELESS | | 30% |
| | | | | ... | | | | ... |
| | | | | 5:01 | VOICE | WIRELESS | | 90% |
| | | | | 5:02 | VOICE | WIRELESS | | 90% |
| | | | | ... | | | | ... |
| | | | | 9:01 | VOICE/FAX | WIRELESS | | 60% |
| | | | | 9:02 | VOICE/FAX | WIRELESS | | 60% |
| | | | | ... | | | | ... |
| | | | | 16:01 | IP/VOICE | WIRELESS | | 90% |
| | | | | 16:02 | IP/VOICE | WIRELESS | | 90% |
| | | | | ... | | | | ... |
| | | | | 19:01 | VOICE | WIRELESS | | 60% |
| | | | | 19:02 | VOICE | WIRELESS | | 60% |
| | | | | ... | | | | ... |
| | | | | 23:58 | VOICE | WIRELESS | | 30% |
| | | | | 23:59 | VOICE | WIRELESS | | 30% |
| SMITH105 | FR | 6/15/01 | ✓ | | | | | 99% |
| SMITH105 | SU | 6/17/01 | | | VOICE | WIRELESS | STADIUM | 95% |

FIG. 4

COMMUNICATION GATEWAY SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to a service control system that grants or denies users requests for communication sessions to the communication system.

2. Description of the Prior Art

When a user attempts to gain access to a communication system, a communication device sends a request for a communication session. The request format is typically a signal. One example of a signal format is Signaling System 7 (SS7), which is well known in the art. For example, when a user attempts to make a landline telephone call, a switch detects an off hook condition and collects caller entered digits for a phone number. The switch sends a query to a Service Control Point (SCP) to determine how to process the call.

The SCP receives the query and determines routing instructions for the call. Interactions between the SCP and the communication system are typically done by Transaction Capabilities Application Part queries (TCAP), which are well known in the art. The SCP responds with routing instructions for the call.

For example, the communication system queries the SCP on an "800" call. The SCP processes the "800" number and returns routing instructions for the call. The SCP contains a database of "800" numbers and the routing instructions for the number. Another example of SCP functionality is dealing with Local Number Portability (LNP). LNP allows users to keep prior telephone numbers regardless of moving to a different telephone company. The SCP receives the user's number and processes the number to determine the number's routing path. The routing path for the call is typically influenced by communication system performance.

Communication system performance is typically determined by examining activity and congestion in the communication system. Communication system performance encompasses the amount of activity in the communication system, the amount of data sent through the communication system, and the number of people attempting to access the communication system.

A typical communication system contains network devices such as switches, routers, bridges, and transmission lines. When an individual switch becomes overloaded or inoperative, the data path through the communication system deviates accordingly. Unfortunately, when multiple switches become overloaded or inoperable, the data flow is unable to deviate as effectively and thus becomes disrupted, corrupted or lost.

The proliferation of telecommunication services, including wireless and Internet access, and the increase in telecommunication users are overloading current communication systems. For example, a customer using a cell phone at a football game receives a "network busy" signal because the wireless base station is overloaded with customers. While communication systems limit access to subscribers, restrictions within subscribers only occur when the communication systems become overloaded and overly congested. These restrictions are both late and ineffective as the communication system is already congested. As such, even users who access the communication system experience reduced connection speed, reduced reliability, and involuntary termination from the communication system.

SUMMARY OF THE INVENTION

The invention solves the above problems by granting or denying requests for communication sessions. A service control system receives a request for the communication session. The service control system processes the request to determine the service availability level for the time period. Service availability levels are the probability of access to the communication system at specific time periods. The service control system determines whether to grant the communication session based on the service availability level for the time period and the communication system performance. The service control system transfers a reply based on the determination whether to grant the communication session.

The invention includes methods, systems, and software for operating a service control system. In one embodiment of the invention, the communication system transfers a TCAP query to the service control system. In another embodiment of the invention, the service control system then receives the TCAP query from the communication system. In another embodiment, the service control system accesses the user's service level agreement from a storage system. In one embodiment, the service control system processes the service level agreement. In another embodiment of the invention, the service control system determines the communication system performance. In one embodiment of the invention, the service control system processes the service availability level against the communication performance to determine whether to grant the request for a communication session. In a further embodiment of the invention, the reply is a dial tone or network busy signal, which indicates the determination whether to grant the users request for a communication session.

The invention has several advantages over previous communication systems in that access to the communication system is kept at a level where congestion and network load is maintained at a manageable rate. While users can access the communication system, access is based on the individual service level agreement and the communication system performance. For example, users can be segregated into different classes of service such as gold, silver, and bronze classes. A gold user has the highest probability of accessing the communication system while bronze users have the lowest. In some embodiments of the invention, the classes of service can be used to designate the user's level of access to the communication system. Communication providers then have the ability to control which classes of users have access to the communication system. As cost increases with the increase in probability of access the majority of users, inferably, will be bronze or silver. Thus, with reduced congestion, users who access the communication system typically receive faster connection speeds, more reliable service and reduced involuntary termination.

BRIEF DESCRIPTION OF THE DRAWINGS

The same reference number represents the same element on all drawings.

FIG. 4 is a diagram of a service level agreement in an example of the invention.

DETAILED DESCRIPTION OF THE PREFERRED EMBODIMENT

Figure 1:
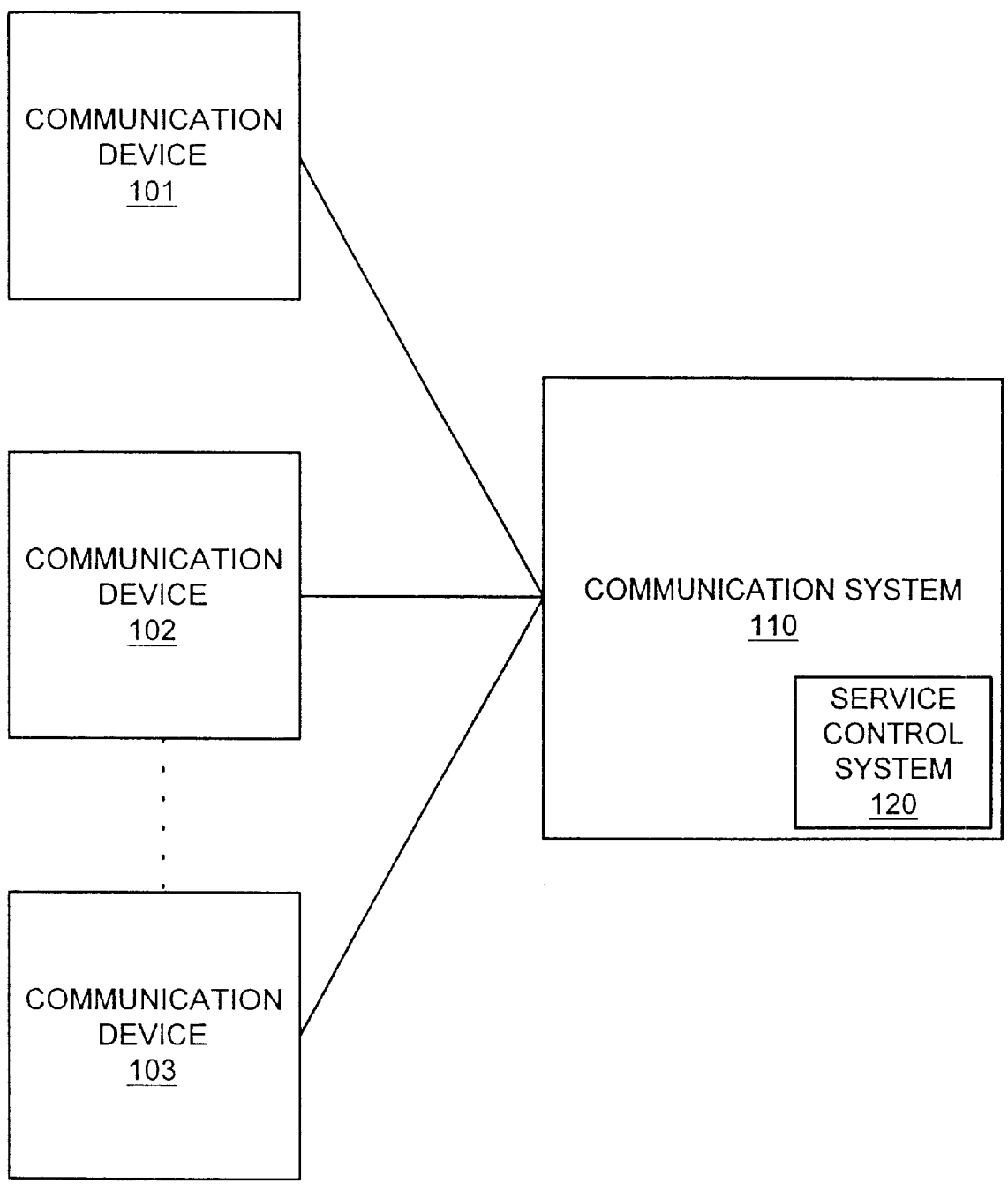
FIG. 1 is a block diagram of a communication system in an example of the invention.
Figure 2:
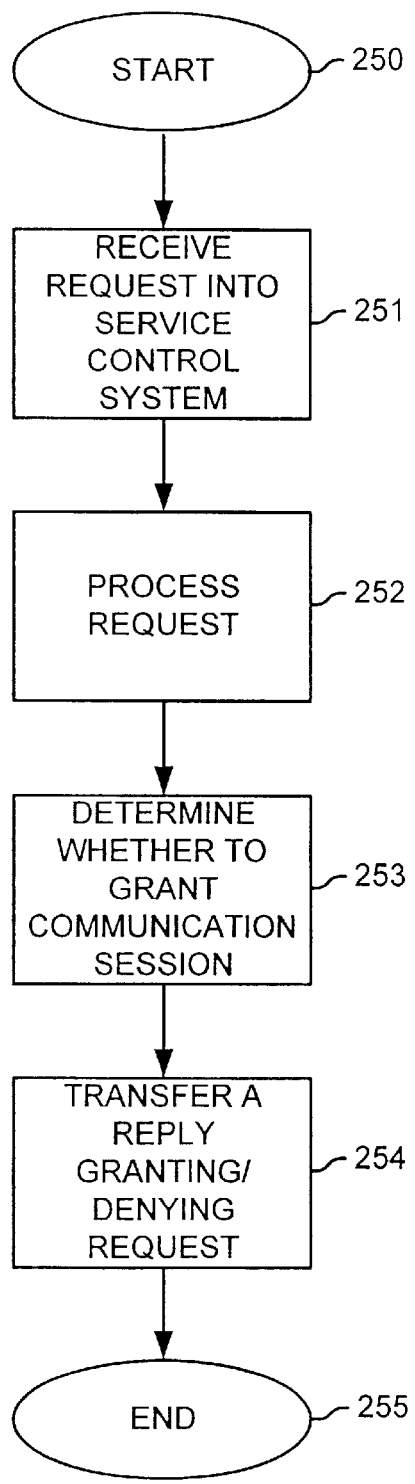
FIG. 2 is a flow chart of a communication system in an example of the invention.

Communication System—FIGS. 1–2

FIG. 1 depicts a communication system 110 that interacts with communication devices 101–103 and a service control system 120. Those skilled in the art will appreciate that there are numerous communication devices and additional levels of complexity that are not shown in FIG. 1 for reasons of clarity.

Communication devices 101–103 communicate with communication system 110. Communication system 120 comprises service control system 120.

Communication devices 101–103 are any devices with the ability to request a communication session. A communication session is any interaction between at least two communication devices via a communication system 110. For example, a communication session encompasses a mobile or landline telephone conversation, Internet session, and other interactions with a communication system 119. While multiple communication devices are depicted in FIG. 1, only communication devices 101–103 are shown for clarity. Some examples of communication devices 101–103 are landline telephones, mobile phones, or computers. Depending on the actual communication device, the interaction with the communication system 110 varies. For example, if communication device 101 is a mobile phone, then the communication device's 101 signals typically travel from the mobile phone to a base station, a mobile telephone switching office, and a destination.

A communication system 110 is any system configured to receive a request from a communication device 101 and provide a communication session. For example, communication system 110 contains switches, routers, transmission lines, and other networking devices necessary for the request sent. In some embodiments, communication system 110 encompasses local and long distance networks. Those skilled in the art will appreciate that the request could be one of many communication protocols, including those that begin sending data without waiting for a reply from the receiver.

A service control system 120 is any processing system configured to (1) receive a request for a communication session, (2) process the request to determine the users service availability level for the time period, (3) determine whether to grant the communication session based on the service availability level for the time period and the communication performance, (4) and transfer a reply based on the determination whether to grant the request for the communication session. An example of a service control system 120 is a service control point. In some embodiments of the invention, a switch performs the functionality of the service control system 120.

A service availability level is the probability of accessing the communication system 110 during a specific time period. For example, the user specifies that between 12:00 a.m. and 5:59 am on Monday the user has a 30% probability of gaining access to the communication system 110, but from 6:00 am to 11:59 am on Monday, the user has a 95% chance of gaining access to the communication system 110. The probability of access is processed against the communication system performance to determine whether to grant the users request.

In another example, the user specifies that when the communication system performance is below 50% the user's request for a communication session will be granted 100% of the time. Conversely, when the communication system performance is above 50% the users request for a communication session will be denied 100% of the time. An example of the operation of the above configuration in one embodiment of the invention is when a user places a telephone call. The communication device 101 sends a request for a communication session to the communication system 110. The request sent from the communication device 101 is typically in an SS7 format. The communication system 110 sends a query, typically a TCAP query via SS7, to the service control system 120. The service control system 120 transfers a reply containing instructions on how to handle the call.

FIG. 2 depicts a flow chart of a service control system 120 in an example of the invention. FIG. 2 begins in step 250. In step 251, the service control system 120 receives the request for a communication session. The request could have originated from a landline phone, mobile phone, computer, or any other communication device.

In step 252, the service control system 120 processes the request to determine the service availability level for the user for the time period.

In some embodiments of the invention, the service control system 120 processes the request to retrieve the identity of the user attempting to access the communication system 110. In some embodiments of the invention, the service control system 120 retrieves the service level agreement from the storage system, which is described below in FIG. 5, based on the user identification. The user identification is unique for each user. For example, the user identification could be a random, or user derived, alphanumeric combination. A user is not limited to an individual. For example, the user identification could be for a department, business, building, group or some other conglomeration.

In step 253, the service control system 120 determines whether to grant the communication session. In some embodiments of the invention, the determination is based on the communication system performance and the service availability level for the time period.

In step 254, the service control system 120 transfers a reply indicating the determination whether to grant the request for the communication session. In some embodiments of the invention, the reply is a dial tone or a network busy signal, which indicates the determination whether to grant the users request for a communication session. FIG. 2 ends in step 255. In another embodiment of the invention, the reply is an Interactive Voice Response (IVR) unit, which asks if the user wishes to complete the request with a higher rate or disconnect the request. IVR's are well known in the art.

Communication System Configuration FIGS. 3–6

FIGS. 3–6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 3:
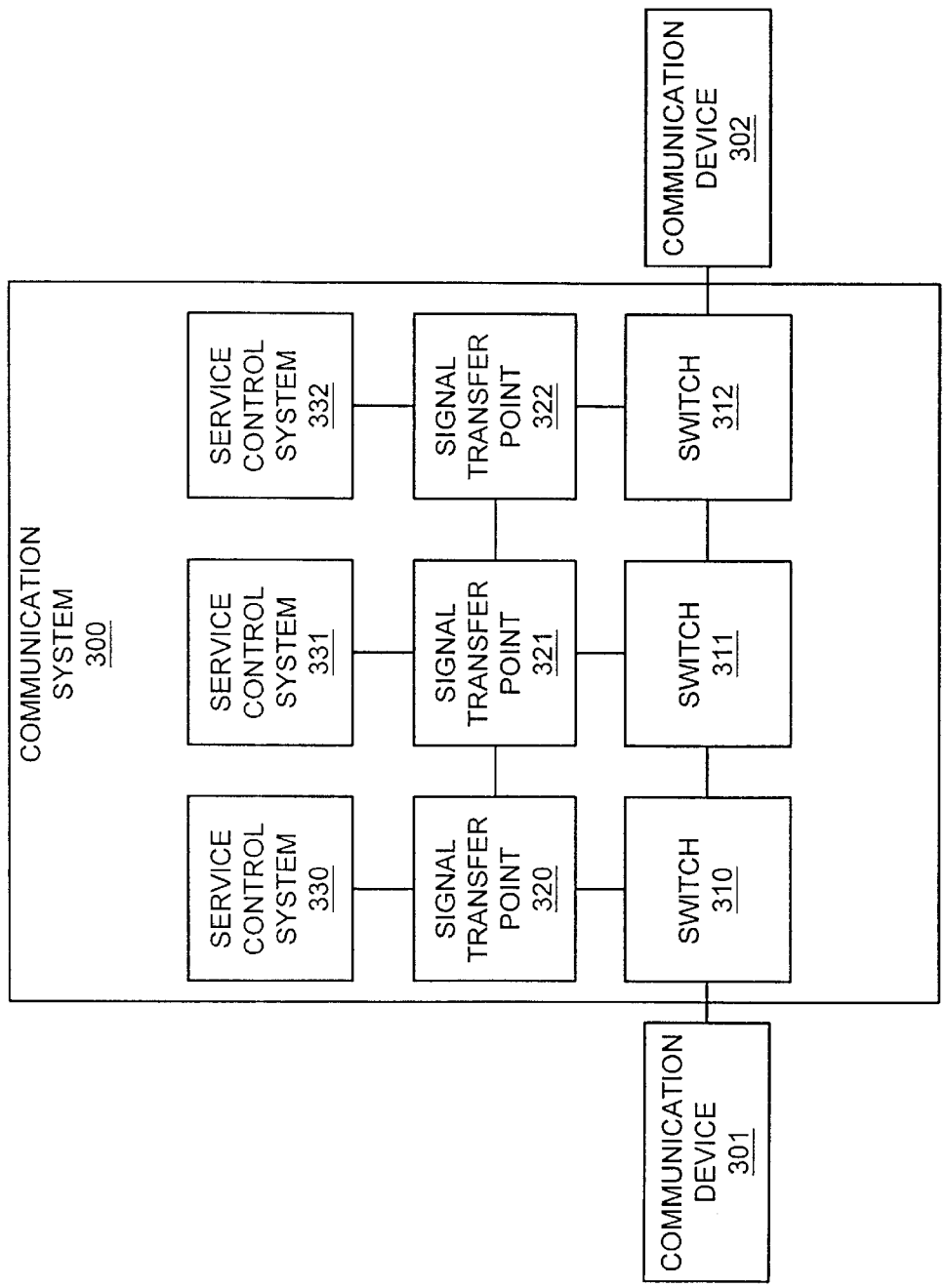
FIG. 3 is a block diagram of a communication system, which includes switches, signal transfer points, and service control points in an example of the invention.

FIG. 3 depicts a configuration of a communication system 300. The communication system 300 comprises communication devices 301–302, switches 310–312, signal transfer points 320–322 and service control systems 330–332.

The communication device 301 is connected to the switch 310. The switch 310 is connected to the signal transfer point 320 and the switch 311. Signal transfer point 320 is connected to the service control system 330 and the signal transfer point 321. Switch 311 is connected to the switch 312 and the signal transfer point 321. Signal transfer point 321 is connected to the signal transfer point 322 and the service control system 331. Switch 312 is connected to the communication device 302 and the signal transfer point 322. Signal transfer point 322 is connected to the service control system 332. Those skilled in the art will appreciate that the above connections encompass all types of network connections including wireless.

Those skilled in the art will further appreciate that FIG. 3 encompasses local and long distance networks. In some embodiments of the invention, the switch 310, the signal transfer point 320, and the service control system 330 represent the local communication system for the incoming call. The switch 311, the signal transfer point 321, and the service control system 331 represent the long distance communication system for the call. The switch 312, the signal transfer point 322, and the service control system 332 represent the local communication system for receiving the call.

An example of the operation of the above configuration in one embodiment of the invention is communication device 301 requests a communication session. Switch 310 receives the request. Switch 310 processes the request. The switch 310 transfers a TCAP query to service control system 330 via the signal transfer point 320.

Service control system 330 receives the TCAP query and retrieves the user's service level agreement. The service control system 330 queries switches 310–312 to determine communication system performance. In some embodiments of the invention, switches 310–312 will automatically transfer system performance data to the service control system 330 or associated system at determined time intervals. Those skilled in the art will appreciate that the performance of the communication system 300 can be determined in many ways including but not limited to receiving operational measurements, call detail records, and event messages. Those skilled in the art will appreciate that call detail records are also known as call accounting records or automatic message accounting records. Communication performance encompasses the system load level, system congestion, system activity, and the state of the system.

Service control system 330 processes the service level agreement against the communication system performance to determine whether to grant the user access to the communication system 300. The service control system 330 generates and transfers a reply to the signal transfer point 320. The signal transfer point 320 transfers the reply to switch 310. Switch 310 transfers the reply to the communication device 301. The reply is typically a dial tone or a network busy signal, which indicates the determination whether to grant the users request for a communication session. Another example of the above embodiment of the invention is communication device 301 is a computer requesting a communication session from an Internet Service Provider.

FIG. 4 depicts a service level agreement in some embodiments of the invention. Those skilled in the art will appreciate that the service level agreement can be written, stored, and manipulated in various ways. For clarity, FIG. 4 depicts only a few areas of information that can be contained within a service level agreement.

The service level agreement in FIG. 4 contains a user id field 401, a day field 402, a date field 403, a flag date field 404, a time field 405, an application field 406, a device field 407, a location field 408, and a service availability level field 409.

The user id field 401 is unique for each user. For example, the user id 401 could be a random, or user derived, alphanumeric combination. A user is not limited to an individual. For example, the user identification 401 could be for a department, business, building, group or some other conglomeration.

The day field 402 contains the day of the week. The day field 402 can be delineated using the days of the week, weekdays and weekends, or some variation therein.

The date field 403 contains the date for each day. The date field 403 interacts with the flag date field 404. When a date has been flagged, the user has specifically requested that day for a higher probability of gaining access to the communication system 300. For example, flagging May 13, "Mother's Day" allows the user to select a higher probability of gaining access to the communication system 300 then the user might otherwise have had on that day. Flagging a date allows the user to gain access when the communication system 300 is at a higher load level.

The time field 405 contains times throughout a 24-hour period. The time field 405 can be stored in various ways. For example, time can be stored in seconds, minutes, hours, morning, afternoon, evening, or any variation therein. In some embodiments of the invention, the time field 405 comprises a time range.

The application field 406 contains an identified application the user can execute. For example, the application 406 can be voice, data shipping, email, or some other application 406.

The location field 408 contains a specified location 408 wherein the user sets a specific probability of gaining access to the communication system. For example, the location field 408 can contain a stadium, building, highway or some other location.

The service availability level field 409 contains the probability of accessing the communication system 300 during a specific time period. For example, the user specifies that between 12 a.m. and 5:59 am on Monday the user has a 30% probability of gaining access to the communication system 300, but from 6:00 am to 11:59 am on Monday, the user has a 95% chance of gaining access to the communication system 300.

Figure 5:
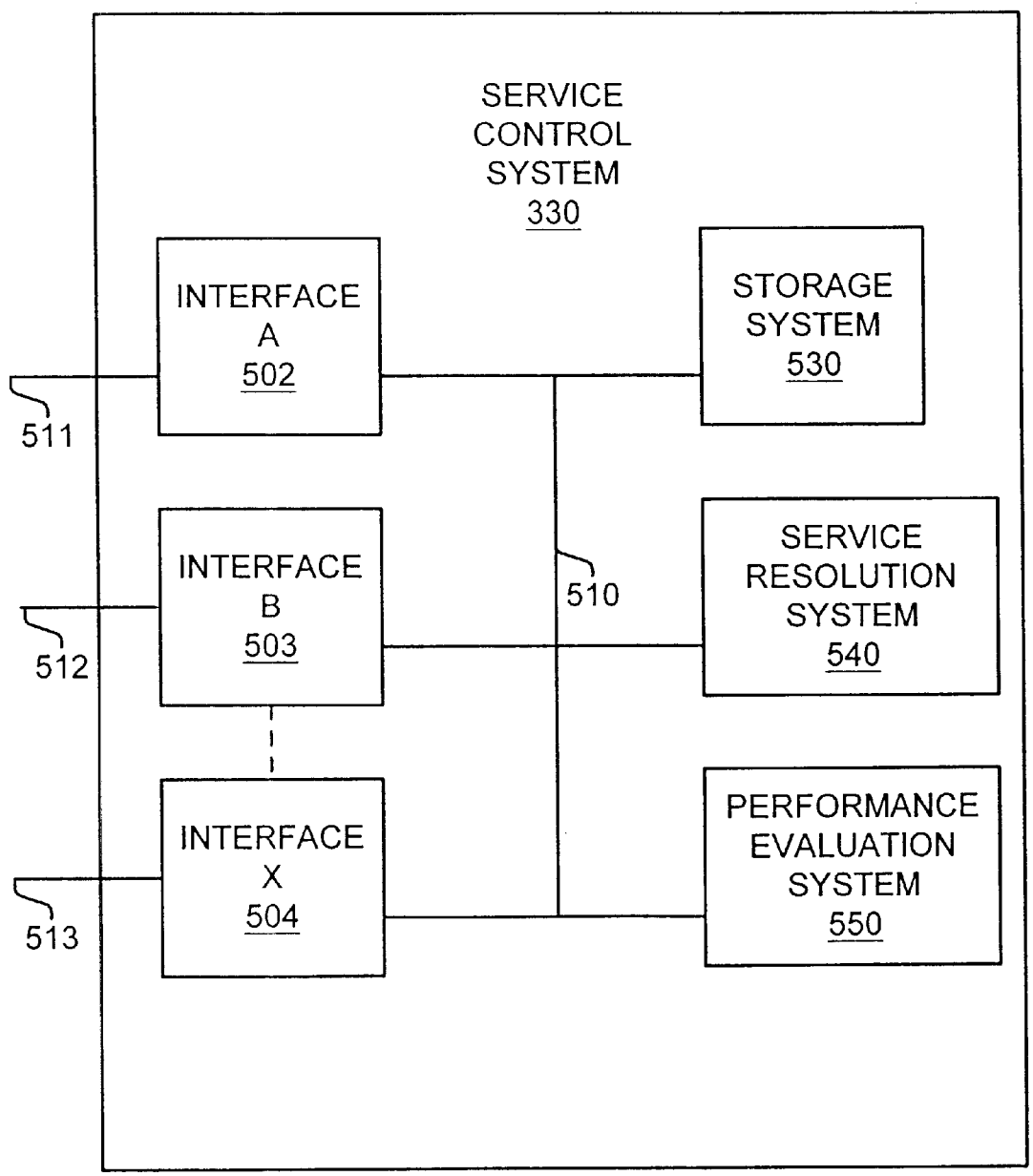
FIG. 5 is a block diagram of the service control system in an example of the invention.

FIG. 5 represents a service control system 330 in an example of the invention. The service control system 330 is a processing system that contains interfaces 502–504, a service resolution system 540, a performance evaluation system 550, and a storage system 530. The service control system 330 can be a service control point but any processing system that functions in the same manner with similar architecture is acceptable.

Link 510 is connected to interface A 502, interface B 503, interface X 504, the storage system 530, the service resolution system 540, and the performance evaluation system 550. Link 511 is connected to interface A 502. Link 512 is connected to interface B 503. Link 513 is connected to interface X 504.

Interfaces 502–504 are configured to receive and transfer requests and replies to and from the communication system 300, via links 511–513. While multiple interfaces are depicted in FIG. 5 only interfaces 502–504 are shown for clarity. Those skilled in the art will appreciate that interfaces 502–504 can handle requests, via links 511–513, from numerous communication system devices including but not limited to switches, signal transfer points, and routers. Interfaces 502–504 could comprise network interface cards or some other communication devices. Interfaces 502–504 may be distributed among multiple communication devices.

The service resolution system 540 and the performance evaluation system 550 could comprise a computer microprocessor, logic circuit, or some other processing device. The service resolution system 540 and the performance evaluation system 550 may be distributed among multiple processing devices. Storage system 530 could comprise a disk, tape, integrated circuit, server, or some other memory device. Storage system 530 may be distributed among multiple memory devices. In some embodiments the service resolution system 540 and the performance evaluation system 550 is one processor.

An example of the operation of the above configuration in one embodiment of the invention is interface A 502 receives a TCAP query, via link 511. Interface A 502 transfers the TCAP query, via link 510, to the service resolution system 540 for processing. The service resolution system 540 requests the service level agreement, via link 510, from the storage system 530. The storage system 530 transfers the service level agreement, via link 510, to the service resolution system 540 for processing.

The performance evaluation system 550 requests communication system performance, via links 510 and 512 and interface B 503, from the communication system 300. In some embodiments, the performance evaluation system 550 requests communication system performance from the storage system's 530 cache. Those skilled in the art appreciate accessing the cache to increase the speed of retrieving data. The communication system 300 transfers communication system performance. Interface A 502 receives the communication system performance, via link 511. Interface A 502 transfers the communication system performance data, via link 510, to the performance evaluation system 550 for processing. The performance evaluation system 550 sends the communication system performance, via link 510, to the service resolution system 540 for processing.

The service resolution system 540 extracts from the service level agreement the user's information. For example, the service resolution system 540 extracts the service availability level for the time period, location of the user, the communication device and the application the user is attempting to execute. The service resolution system 540, taking into account all the information contained in the service level agreement, processes the service level agreement against the communication system performance to determine whether to grant the users request for a communication session. The service resolution system 540 generates a reply based on the determination. The service resolution system 540 transfers the reply, via link 510, to interface B 503. Interface B 503, receives the reply, via link 510. Interface B 503 transfers the reply, via link 512, through the communication system 300 to the user.

The user has the option of overriding their service level agreement by entering pre-set codes or dialing specific numbers. When the service control system 330 receives the pre-set code or specific numbers, the user's communication session is granted regardless of the service availability level for that time period. For example, when the user dials an emergency number like "911," the request will be granted regardless of the service level agreement for that time period.

Figure 6:
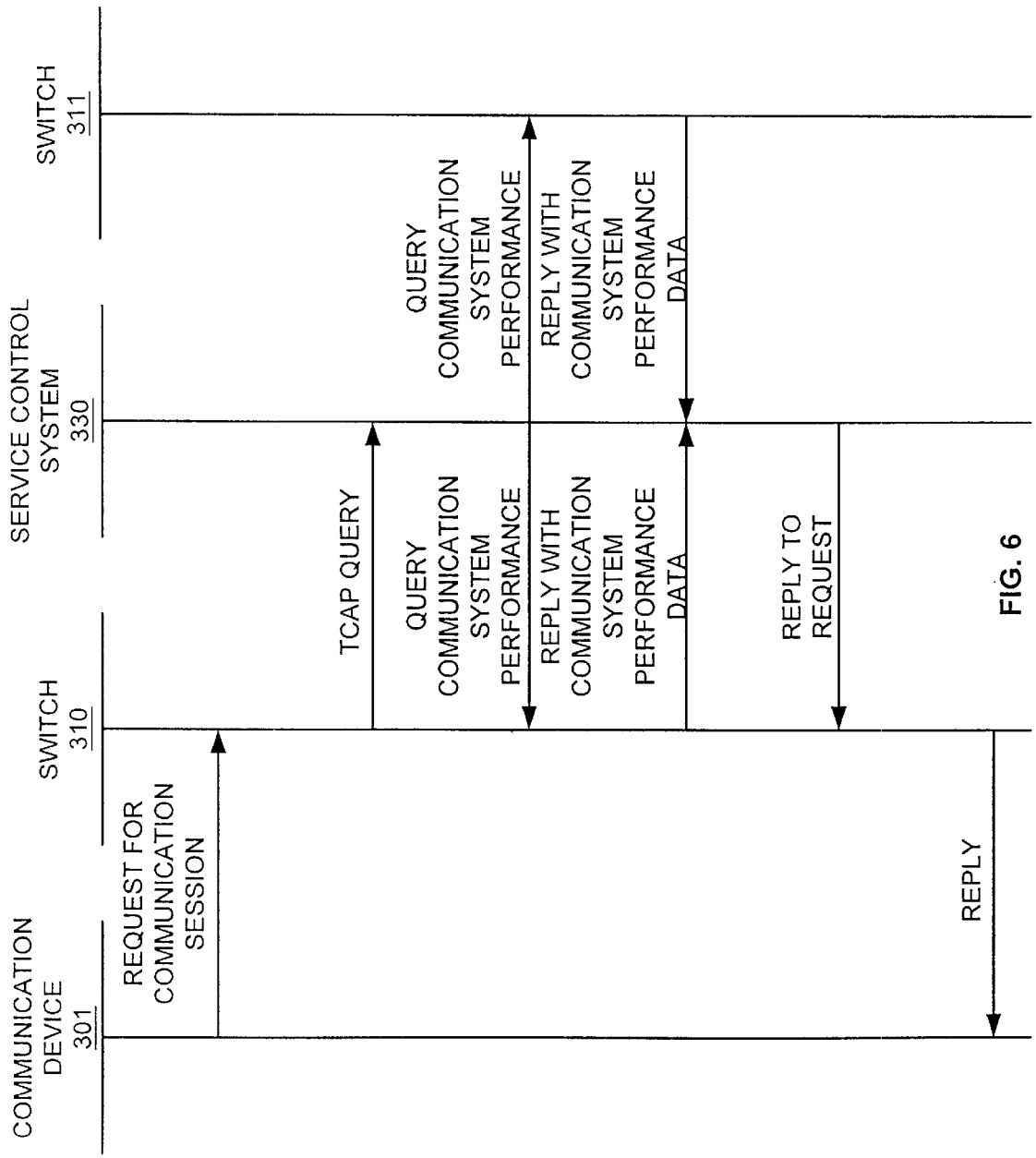
FIG. 6 is a message sequence chart of a communication system in an example of the invention.

FIG. 6 is a message sequence chart that depicts the operation of the invention during a landline phone call in some embodiments of the invention. FIG. 6 begins with a user requesting a communication session via a communication device 301. The communication device 301 sends a request for a communication session, which is received by the switch 310. The switch 310 sends a TCAP query to the service control system 330. The service control system 330 receives and processes the TCAP query. The users service level agreement is extracted from the storage system 530 for processing.

The service control system 330 queries switches 310 and 311 to determine communication system performance. In some embodiments of the invention, the communication system performance data is located in the service control system's 330 cache. In other embodiments of the invention, the service control system 330 uses statistical communication system performance measurements without querying switches 310 and 311. Those skilled in the art will appreciate that multiple switches are queried, as well as other communication system devices, but for reasons of clarity are not shown in FIG. 6. Switches 310 and 311 receive and process the query. Switches 310 and 311 reply with communication system performance data to the service control system 330 for processing. The service control system 330 processes the service level agreement against the communication system performance to determine whether to grant the users request for a communication session. For example, a service level agreement might specify a service availability level, or probability of gaining access to the communication system 300 of 90% for a specific time period, device, application, and location, when the communication system performance is at a certain level.

The service control system 330 generates a reply based on its determination of whether to grant the user access to the communication system 300. The service control system 330 transfers the reply to the switch 310. The switch 310 transfers the reply to the communication device 301. Depending on the reply, the user typically receives a network busy signal or a dial tone, which indicates the determination whether to grant the users request for a communication session.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

What is claimed is:

1. A method of operating a service control system for a communication system wherein a service level agreement for a user specifies service availability levels for time periods, the method comprising:

receiving a request for a communication session;

processing the request to determine one of the service availability levels for one of the time periods for the user;

determining whether to grant the communication session based on one of the service availability levels for one of the time periods and a communication system performance; and transferring a reply based on the determination whether to grant the request for the communication session.

2. The method of claim 1 further comprising determining the communication system performance.

3. The method of claim 2 wherein determining the communication system performance is based on communication system performance records.

4. The method of claim 2 wherein determining the communication system performance is based on applying an averaging calculation on communication system performance records.

5. The method of claim 2 wherein determining the communication system performance is based on applying a peak calculation of the communication system performance records.

6. The method of claim 2 wherein determining the communication system performance is based on call detail records.

7. The method of claim 2 wherein determining the communication system performance is based on operational measurements or measurement records.

8. The method of claim 2 wherein determining the communication system performance is based on an event message.

9. The method of claim 1 wherein the service control system comprises a service control point.

10. The method of claim 1 wherein determining whether to grant the communication session is further comprised of:
processing the service level agreement for the user; and
processing one of the service availability levels against the communication system performance.

11. The method of claim 1 wherein the service level agreement comprises a user identification number.

12. The method of claim 1 wherein the service level agreement comprises time periods.

13. The method of claim 12 wherein the time periods comprises a time of day.

14. The method of claim 12 wherein the time periods comprises a day of the week.

15. The method of claim 12 wherein the time periods comprises a day of the year.

16. The method of claim 1 wherein the service level agreement comprises a reference to a location.

17. The method of claim 1 wherein the service level agreement comprises a reference to an identified communication device.

18. The method of claim 1 wherein the service level agreement comprises a reference to an identified communication application.

19. The method of claim 1 wherein the service level agreement comprises the service availability levels, which are probability of access to the communication system for each of the time periods for the user.

20. The method of claim 1 wherein receiving the request for the communication session further comprises:
receiving the request that includes an override message of the applicable one of the service availability levels for the applicable one of the time periods for the user; and
granting the request for the communication session based on the override message.

21. A service control system for a communication system wherein a service level agreement for a user specifies service availability levels for time periods, the system comprising:

a processor configured to receive a request for a communication session from an interface, process the request to determine one of the service availability levels for one of the time periods for the user, determine whether to grant the communication session based on one of the service availability levels for one of the time periods and a communication system performance, and transfer a reply to the interface; and the interface connected to the processor and configured to transfer the request for the communication session to the processor, and transfer the reply from the processor.

22. The system of claim 21 wherein the processor is further configured to determine the communication system performance.

23. The system of claim 22 wherein the processor is configured to determine the communication system performance is based on communication system performance records.

24. The system of claim 22 wherein the processor is configured to determine the communication system performance is based on applying an averaging calculation of the communication system performance records.

25. The system of claim 22 wherein the processor is configured to determine the communication system performance is based on applying a peak calculation of the communication system performance records.

26. The system of claim 22 wherein the processor is configured to determine the communication system performance is based on call detail records.

27. The system of claim 22 wherein the processor is configured to determine the communication system performance is based on operational measurements or measurement records.

28. The system of claim 22 wherein the processor is configured to determine the communication system performance is based on an event message.

29. The system of claim 21 wherein the service control system comprises a service control point.

30. The system of claim 21 wherein the processor is configured to process the service level agreement for the user and process one of the service availability levels against the communication system performance.

31. The system of claim 21 wherein the service level agreement comprises a user identification number.

32. The system of claim 21 wherein the service level agreement comprises time periods.

33. The system of claim 32 wherein the time periods comprises a time of day.

34. The system of claim 32 wherein the time periods comprises a day of the week.

35. The system of claim 32 wherein the time periods comprises a day of the year.

36. The system of claim 21 wherein the service level agreement comprises a reference to an identified location.

37. The system of claim 21 wherein the service level agreement comprises a reference to an identified communication device.

38. The system of claim 21 wherein the service level agreement comprises a reference to an identified communication application.

39. The system of claim 21 wherein the service level agreement comprises the service availability levels, which are probability of access to the communication system for each of the time periods for the user.

40. The system of claim 21 wherein the processor is configured to receive the request for the communication session further comprises:

receiving the request that includes an override message of the applicable one of the service availability levels for the applicable one of the time periods for the user; and granting the request for the communication session based on the override message.

41. A software product for a service control system, the software product comprising:

control software configured to direct a processor to receive a request from a communication system for a communication session, process the request to determine service availability levels for time periods for a user, determine whether to grant the communication session based on one of the service availability levels for one of the time periods and a communication system performance; and transferring a reply based on the determination whether to grant the request for the communication session; and a storage medium that stores the control software.

42. The software product of claim 41 wherein the control software is further configured to direct the processor to determine the communication system performance.

43. The software product of claim 42 wherein the control software is configured to direct the processor to determine the communication system performance is based on communication system performance records.

44. The software product of claim 42 wherein the control software is configured to direct the processor to determine the communication system performance is based on applying an averaging calculation of the communication system performance records.

45. The software product of claim 42 wherein the control software is configured to direct the processor to determine the communication system performance is based on applying a peak calculation of the communication system performance records.

46. The software product of claim 42 wherein the control software is configured to direct the processor to determine the communication system performance is based on call detail records.

47. The software product of claim 42 wherein the control software is configured to direct the processor to determine the communication system performance is based on operational measurements or measurement records.

48. The software product of claim 42 wherein the control software is configured to direct the processor to determine the communication system performance is based on an event message.

49. The software product of claim 41 wherein the service control system comprises a service control point.

50. The software product of claim 41 wherein the control software is configured to process the service level agreement for a user and process one of the service availability levels against the communication system performance.

51. The software product of claim 41 wherein the service level agreement comprises a user identification number.

52. The software product of claim 41 wherein the service level agreement comprises time periods.

53. The software product of claim 52 wherein the time periods comprises a time of day.

54. The software product of claim 52 wherein the time periods comprises a day of the week.

55. The software product of claim 52 wherein the time periods comprises a day of the year.

56. The software product of claim 41 wherein the service level agreement comprises a reference to a location.

57. The software product of claim 41 wherein the service level agreement comprises a reference to an identified communication device.

58. The software product of claim 41 wherein the service level agreement comprises a reference to an identified communication application.

59. The software product of claim 41 wherein the service level agreement comprises service availability levels, which are probability of access to the communication system for each of the time periods for the user.

60. The software product of claim 41 wherein the control software is configured to direct a processor to receive the request for the communication session further comprises:

receiving the request that includes an override message of the applicable one of the service availability levels for the applicable one of the time periods for the user; and granting the request for the communication session based on the override message.

* * * * *